United States Patent
Ghahary et al.

(10) Patent No.: US 8,128,999 B2
(45) Date of Patent: *Mar. 6, 2012

(54) FIRE RESISTANT SPRAYABLE COATING COMPOSITION

(75) Inventors: Akbar Ghahary, Fort Lee, NJ (US); Yifang Zhao, Randoph, NJ (US)

(73) Assignee: Safas Corporation, Clifton, NJ (US)

( * ) Notice: Subject to any disclaimer, the term of this patent is extended or adjusted under 35 U.S.C. 154(b) by 1291 days.

This patent is subject to a terminal disclaimer.

(21) Appl. No.: 11/295,068

(22) Filed: Dec. 6, 2005

(65) Prior Publication Data

US 2007/0125990 A1    Jun. 7, 2007

(51) Int. Cl.
*C09D 5/18* (2006.01)
*C08L 67/06* (2006.01)
*C08G 63/91* (2006.01)
*C08G 63/692* (2006.01)

(52) U.S. Cl. ......... 427/427.4; 523/171; 525/15; 525/20; 525/25; 525/445; 528/275; 528/287

(58) Field of Classification Search .............. 252/601; 523/171; 427/427, 427.4; 525/15, 20, 25, 525/445; 528/275, 287
See application file for complete search history.

(56) References Cited

U.S. PATENT DOCUMENTS

| | | | |
|---|---|---|---|
| 4,085,246 A | 4/1978 | Buser et al. | |
| 4,175,064 A * | 11/1979 | Landau et al. | 525/17 |
| 4,433,070 A | 2/1984 | Ross et al. | |
| 4,664,954 A | 5/1987 | Hurd | |
| 4,678,819 A | 7/1987 | Sasaki et al. | |
| 4,734,452 A | 3/1988 | Hashimoto et al. | |
| 5,043,377 A | 8/1991 | Nogi et al. | |
| 5,055,327 A | 10/1991 | Baskin | |
| 5,079,279 A * | 1/1992 | Hayashi et al. | 523/171 |
| 5,244,941 A | 9/1993 | Bruckbauer et al. | |
| 5,286,290 A | 2/1994 | Risley | |
| 5,314,729 A | 5/1994 | Ikezoe et al. | |
| 5,476,895 A | 12/1995 | Ghahary | |
| 5,571,863 A * | 11/1996 | Smeal et al. | 525/44 |
| 5,708,066 A * | 1/1998 | Otremba et al. | 524/127 |
| 5,741,448 A * | 4/1998 | Wiseman | 264/28 |
| 5,932,653 A * | 8/1999 | Nowak | 525/17 |
| 6,194,525 B1 * | 2/2001 | Ortiz et al. | 525/42 |
| 6,746,640 B2 * | 6/2004 | Weberg et al. | 264/271.1 |
| 7,442,726 B2 * | 10/2008 | Ghahary et al. | 523/171 |
| 2005/0043426 A1 * | 2/2005 | Taylor | 522/1 |

* cited by examiner

*Primary Examiner* — Michael Pepitone
(74) *Attorney, Agent, or Firm* — Bernd W. Sandt

(57) ABSTRACT

A sprayable granite-like coating composition useful for forming simulated stone surfaces, such as polished granite, which have improved fire resistance. The coating composition comprises gel resin matrix based on unsaturated crosslinkable polyester or acrylic resins, a free radical initiator for such resin, a hydrated inorganic salt, granules comprising thermoset resins or mixtures of thermoplastic and thermoset resins containing an inorganic filler and as a binding agent comprising the acrylate phosphate.

4 Claims, No Drawings

FIRE RESISTANT SPRAYABLE COATING COMPOSITION

BACKGROUND OF THE INVENTION

The present invention relates generally to a composition useful in forming synthetic surfaces simulating various natural stone substances such as field stone, granite, marble and the like. More particularly the present invention relates to compositions comprising organic resin materials capable of being sprayed onto horizontal and vertical solid surfaces which, when cured, simulate various natural substances such as granite and which exhibit improved flame resistant properties.

Processes currently exist for forming synthetic materials and surfaces, which mimic the appearance of various natural substances such as stone, marble and the like. Such materials are commonly used in the manufacture of floor and other types of tiles, shower enclosures, countertops, sinks, architectural facings, ornamental objects, and generally for any other purpose that marble, stone or the like are used.

One such example is a process utilizing a laminated sheet of material marketed under the trademark FORMICA. Such material is formed in large sheets and then cut and applied to the desired surface by adhesive or the like. Such sheets can be manufactured in solid colors or in various patterns, some of which simulate various stone or other textured materials.

Another example is a process for preparing a material, which is commonly referred to as "cultured marble". "Cultured marble" is formed by first creating a mold of a desired shape, spraying the internal mold surface with a gel coat and then filling the mold with a conventional casting resin. Pigments are added to the resin to give it the desired color or pattern. After the resins have set, the mold is removed with the surface facing the mold forming the outer surface of the finished product.

Although many of the prior art methods for creating synthetic surfaces simulating stone and the like are generally acceptable, there is a continuing effort to develop compositions which give rise to more uniform, smoother coatings as well as surfaces which more closely simulate the various natural materials such as polished field stone, marble or granite and the like. Accordingly, there is a continuing need and desire to improve upon existing methods. Another object is to provide for coating compositions, which are flame resistant, and yet maintain the impact resistance and flexural strength required to provide simulated stone coatings in such applications as kitchen counters. It is known that flame retardency can be increased by the addition of increasing amounts of inorganic filler in the matrix resin. Such increases in filler amounts in the matrix resin, however, result in the embrittlement of the coating composition and do not result in a useful product.

Examples of suitable gel coatings may be found in U.S. Pat. No. 4,543,366, issued Sep. 24, 1985 to Smith, U.S. Pat. No. 5,028,459, issued Jul. 2, 1991 to Lathrop and U.S. Pat. No. 4,664,982, issued May 12, 1987 to Genovese, et al., the contents of each of which are herein incorporated by reference.

In order to obtain a simulated stone coating the resin matrix must contain solid fillers, which provide the stone appearance. Such stone fillers have densities which are much higher than the matrix resin density and thus tend to settle out and coatings do not provide the desired simulated stone appearance. Various approaches have been developed to address this problem. For example, Lathrop uses crushed stone aggregate having a density substantially greater than that of the gel coat.

Thus, to get a three-dimensional display, multiple sequential layers of gel coat and matrix must be applied. The subject invention overcomes this problem by using particulates which are substantially equal in density with the matrix resin composition and by means of controlling the crosslinking reaction to prevent settling.

A similar problem was addressed in the context of cast molded granite-like artificial stone in U.S. Pat. No. 5,043,377, issued Aug. 27, 1991 to Nogi, et al. Nogi, et al. suspended cured thermoplastic chips containing a large proportion of filler within a thermoplastic resin casting composition and stated that chips and liquid matrix should be close to each other in specific gravity. However in spraying compositions more uniform results without settling are obtained by using thermosetting resins as matrix resins and controlling the rate of crosslinking and curing.

U.S. Pat. No. 5,476,895 issued to Akbar Ghahary discloses sprayable coating compositions based on the concept of using a thermosetting resin matrix and crosslinked resin granules containing inorganic fillers. The granules and the matrix have essentially the same density. Although such compositions are useful in spray applications they are extremely sensitive to variations in viscosity and frequently do not provide uniform thickness in allowing the coating to flow before it is sufficiently crosslinked to stay in place, this is particularly true when the coating composition is sprayed onto a vertical surface.

The subject invention provides compositions that have sufficiently high inorganic filler content to provide improved fire resistance over known equivalent compositions while at the same time providing compositions with increased rates of polymerization of the matrix resin when sprayed at room temperatures. This increased rate of polymerization of the highly filled compositions is accomplished without discoloring the matrix resin base and providing a more uniform simulated stone coating. The subject coating compositions can be sprayed, brushed, rolled or curtain walled directly onto a surface as a final over-spray or sprayed, or brushed rolled or curtain walled onto the inside surface of a mold and then backed with a substrate, such as fiberglass or resin.

SUMMARY OF THE INVENTION

The invention provides an improved flame resistant composition of matter for forming a coating, with a surface that simulates polished stone, such as granite. The coating compositions comprise a crosslinkable liquid resin matrix, inorganic filler, a particulate crosslinked resin filler, hereinafter also referred to as granules, which contains additional inorganic filler and a binding agent which allows greater amounts of inorganic filler to be added to both the matrix and the granules. The term crosslinkable as used herein is intended to include a free radical initiator in addition to the resin itself. In a preferred embodiment the compositions of then present invention include a polymerization accelerator system. The matrix resin and the granules have substantially the same density by which is meant that granules will not visibly settle during the spraying and curing steps as a result of gravity. The term particulate is intended to characterize the granules as being substantially immiscible in the matrix resin. The flame resistant properties of the coating compositions of the present invention are accomplished by increasing the amount of inorganic filler in both the granules and in the matrix without significantly decreasing the other physical properties of the resulting coating. This is accomplished by the use of the binder of the present invention, which allows for a more uniform adhesion of the resin to the filler and also a more uniform distribution of the filler in the matrix.

The coating compositions of the present invention can be sprayed on any solid substrate by contacting the coating composition with the substrate using commercially available spraying equipment. Obviously the coating compositions can be used in other methods of applying a coating such as by painting or casting even though designed for spray applications. This is in contrast to many prior art compositions, which may be suitable as casting resins, but fail to provide useful spraying compositions, which require much higher reaction rates in the crosslinking of the matrix resin. Furthermore in contrast to available coating compositions, the compositions of the present invention allow for spraying on vertical surfaces and yet give rise to uniform coatings on such surfaces.

DETAILED DESCRIPTION OF THE INVENTION

The sprayable coating compositions of the present invention comprise a four-component system of a crosslinkable matrix resin, granules, inorganic filler, a polymerization initiator and a binding agent. In a preferred embodiment the polymerization initiator is incorporated in an accelerator system the key characteristic of which is that when used there is no visible settling of granules during the spraying and curing steps and that there is insubstantial flow of the coating during the spraying and curing steps to provide uniform thickness. Another key characteristic of the compositions of the present invention is that they can be sprayed and cured at room temperatures.

The preferred crosslinkable matrix resins are unsaturated polyester resins known in the industry as gel coat resins. They comprise in general a low molecular weight linear resin obtained by the condensation of a phthalic acid component with diols and also with an unsaturated component such as maleic anhydride to provide crosslinking properties. The polyester is dissolved normally in an aromatic monomer such as styrene, which acts as the crosslinking agent for the polyester resin when its polymerization is initiated. The polyester may be modified by adding other monomers in addition to styrene such as acrylic acids or acrylate esters to achieve specific properties. Also linear dicarboxylic acids, such as adipic acid or other aliphatic acid, may be added to the phthalic acid component to increase flexibility. Preferred unsaturated polyester resins are condensation products of isophthalic anhydride and neopentyl glycol (NPG). These resins are commercially available from a number of sources such as Reichhold, Ashland, Lilly Industries, Valspar and Polydine as gel coat resins. Other matrix resin that can be employed are acrylic resins, based on such monomers as methyl methacrylate, ethyl acrylate or butyl acrylate, suspended in the acrylate monomer known in the art as sirups. In order to crosslink the acrylic resin diunsaturated acrylate monomers are added to the sirup. Such diunsaturated monomers include glycidyl methacrylate and ethylene dimethacrylate ethylene glycol diacrylate, divinyl benzene, diallyl phthalate and allyl acrylate or methacrylate. The acrylate resins may further be modified to contain polyurethane resins in addition to or in place of the low molecular weight acrylic resin.

The polymerization of the sprayable matrix resin is usually initiated by the addition of free radical initiator and preferably a peroxy or azo compound such as methyl ethyl ketone peroxide, t-butyl perbenzoate, and lauroyl peroxide, or 2,2' azobisisobutyronitrile.

It is generally desirable to include inorganic filler or fillers in with the matrix resin, in part to provide particulate background color for the simulated stone appearance, and in part to achieve substantially equal density with the granules to be added as well as to provide the fire retardancy of the compositions of the present invention. The preferred inorganic fillers used in the present invention are inorganic hydrated salts such as hydrated clays, talc or gypsum and in particular alumina trihydrate because of the increased fire resistance obtained with such fillers. Another preferred additive in order to improve the sprayability and uniformity of the sprayed composition is a thixotropic agent such as fumed silica. Similarly other ingredients that increase oxidative stability, UV-light resistance, fire retardancy or temperature stability may also be added.

The second component, the granules, is mixed into the fluid matrix resin to form the sprayable composition and provide the simulated stone appearance of the composite. The term "granules" as used herein is intended to include the terms "chips" and "particulates" which are used in the art to define similar composition. Granules are generally obtained from the same resins as employed in the matrix resins although such is not essential. Thus unsaturated polyester and acrylic resins can be employed to form the granules. The resins are admixed with inorganic fillers, pigments and any other desirable additive to provide the simulated stone properties when admixed after crosslinking in particulate form with the matrix resin. The density of the granule resin can be adjusted by using combinations of fillers of varying densities. Although inorganic fillers are usually heavier than the resin and therefore add to the density of the granules, such increases can be offset by using lighter fillers such as glass microbubbles or fumed silica. The granules are formed by casting the resin into an open mold, crosslinking the resin and then pulverizing the resin to the desired particle size range between 10 and 200 U.S. Mesh size. Preferred average particle sizes are in the range of 200 to 500 microns. Although the granules provide a "granite-like" stone appearance, they do not significantly detract from the overall transparent characteristic of the gel coat. The preferred filler, in part because of its fire retardancy, used in the formation of the granules is alumina trihydrate, which is generally used in concentrations of 10 to 60% by weight of the granule. Other usable fillers include alkaline earth metal carbonates and silicates such as calcium carbonate or limestone, talc, clays, gypsum, chalk or marble. Since natural stone has the appearance of containing different colored particles it is generally desirable to add a pigment to the granule resin such as titanium dioxide to obtain a white granule and carbon black to obtain a black granule.

The granules also preferably contain a thermoplastic resin component the presence of which adds to the interfacial bonding of the granules with the matrix resin. Such thermoplastic components are obtained by adding an excess of monomer above that which is required for cross-linking to form a thermoplastic component. Thus in the case of a unsaturated polyester resin an excess of styrene is provided such that in addition to the crosslinked polyester the granules also contain some thermoplastic polystyrene. The preparation of granules as used in the present invention has been described in the literature such as U.S. Pat. No. 5,476,895, which is hereby incorporated by reference.

In a preferred embodiment of the present invention an accelerator composition is employed, which allows the compositions to be sprayed with out running or thinning by accelerating the crosslinking of the matrix resin without color formation, particularly at room temperature spraying conditions. The accelerators of the present invention are at least a two component and preferably a three-component mixture comprising (a) an alkali metal carboxylate or calcium hydroxide or carboxylate, wherein the carboxylate has from 6 to 22 carbon atoms, (b) a hetero organic compound comprising either a di-nitrogen substituted amide, a tri-nitrogen substituted amine or a sulfur substituted mercaptan and (c) optionally a heavy metal compound selected from the class of copper, cobalt and zinc carboxylate where the carboxylate contains from 6 to 22 carbon atoms. Examples of suitable alkali metal carboxylates include sodium octoate, sodium benzoate, sodium naphthenate, sodium laurate and sodium and potassium fatty acid carboxylates in general. Tertiary amide compounds include N,N'-dimethylacetoacetamide, and N,N' diethylacetoacetamide. Tertiary amines useful in the accelerator compositions include Dimethyl p-toluidine, diethylaniline, dimethylaniline, N,N-bis(2-hydroxyethyl)p-toluidine and N,N-bis-(2-hydroxyprpopyl)toluidine. Mercaptans useful in the accelerator include glycol dimercaptoacetate, glycol dimercaptopropionate, Isooctyl 3-mercaptopropionate, pentaerythritol tetra-(3-mercaptopropionate) and trimethylolpropane tri-(3-mercaptopropionate). Each component is usually employed in the range of 0.1 to 5% by weight of the matrix resin. In the case of unsaturated polyester resins it is preferred to employ the identified substituted nitrogen compounds with alkali metal carboxylates whereas in the case of the acrylic resin it is preferred to employ the substituted mercaptans in combination with alkaline earth metal carboxylates. The accelerator of the present invention are necessary elements in the matrix resin composition to achieve desired coating properties but can also be employed optionally in the preparation of the granules.

The binding compositions employed in the present invention, which allow for the inclusion of higher amounts of inorganic filler, and particularly alumina trihydrate to thereby increase the fire resistance are acrylate phosphates which are obtained by the reaction of phosphorus pentoxide and hydroxy acrylates to give acrylate phosphates wherein the ester of the acrylate has from 1 to 8 carbons. Suitable phosphates include those of methyl methacrylate, ethyl acrylate, ethyl methacrylate, propyl acrylate, propyl methacrylate and butyl acrylate. These compositions are employed in a concentration of 0.5 to 5% by weight of the resin filler mixture. The binders can be employed in either or both the manufacture of the granules or in the matrix of the coating composition.

The coating produced is generally a transparent or highly translucent coating having a sufficient amount of alumina trihydrate therein to mask the color of the object being coated. Such coatings tend to be more stable at temperatures at which conventional gel coats break down. This increased stability may be due to thermal conductivity and thermal dissipation provided by the alumina trihydrate. The subject coatings generally have higher impact strength than coatings currently available on the market. In testing done to date, the subject coatings have been shown to exhibit twice the impact strength and greater hardness than currently available coatings.

The subject composition of matter is normally mixed and then sprayed through a conventional spraying apparatus. Such spraying mechanisms are not described here in detail, but are commonly known to those skilled in the coating art. Alternatively, the composition may be brushed, rolled, curtain walled, or applied by other means.

The following examples show the preparation of granules useful in the coating compositions of the present invention

EXAMPLE A 100 lbs. of white granule polyester composition was made with the following ingredients:

| | |
|---|---|
| 35 lbs. | Commercially available isophthalate/neopentyl glycol resin containing styrene monomer (Reichhold 32168-20) |
| 65 lbs. | Filler - alumina trihydrate |
| 4 lbs. | Pigment - titanium dioxide |
| 15 lbs. | Lightweight filler - 3M glass micro bubbles |
| 1 lb. | Catalyst - "Triganox KSM" |
| 0.5 lbs | Methyl methacrylate phosphate |

The foregoing polyester composition was blended in a vacuum mixer, where air was removed. Material was then transferred to a closed metal mold and heated in an oven for one (1) hour at 300° F. The resulting cured crosslinked resin was removed from the mold and crushed to not larger than ¼ diameter in a granulator. Granulated material was then transferred to pulverizing machinery to create various particle sizes ultimately for suspension in Resin A. The pulverized material was then transferred to classification machinery to segregate the various sizes and eliminate particles not retained on U.S. Mesh 140. Particles finer than U.S. Mesh 140 can increase viscosity and alter color in the final sprayable surfacing material. Black granules were made by replacing the titanium dioxide with carbon black.

EXAMPLE B 100 lbs of the following white acrylic resin granule was made from the following composition

| | |
|---|---|
| 35 lbs. | Commercially available. Polymethyl methacrylate sirup containing MMA monomer (Degussa Corp) |
| 65 lbs. | Filler - alumina trihydrate |
| 4 lbs. | Pigment - titanium dioxide |
| 0.25 lbs | mercaptan |
| 1 lb. | Catalyst - Eperox 41-25 |
| 0.5 lbs | methyl methacrylate phosphate |

The acrylic composition was blended in a vacuum mixer, where air was removed. Material was then transferred to a closed metal mold and cured in an oven for one (1) hour at room temperature, and then postcured for 30 min at 212° F. The resulting crosslinked acrylic resin was then comminuted into granules following the procedure as set forth in Example A. Black acrylic resin granules were made by replacing the titanium dioxide with carbon black.

The following exemplify the sprayable coating compositions of the present invention:

EXAMPLE I

Preparation of sprayable polyester coating material containing the following components by weight in parts:

| | |
|---|---|
| 40 | Commercially available crosslinkable isophthalic/neopentyl glycol resin with styrene monomer (Reichhold 32168-20). |
| 5 | "3M" micro glass bubbles. |
| 50* | Surface treated alumina trihydrate (ATH) with an average particle size of 15 microns used for added surface hardening properties and fire retardency. |
| 20 | 50/50 blend of white and black granules as prepared by the procedure OF Example A. |
| 0.5 | Sodium, octoate |

-continued

| | |
|---|---|
| 0.25 | N,N''-dimethylacetoacetamide |
| 0.15 | cobalt octoate |
| 1.5 | methyl methacrylate phosphate |

*The ATH is preferably treated with a silane coupling agent to improve the contact between the matrix resin and the filler.

The components of the composition were combined with gentle agitation until the insoluble components were uniformly distributed in the matrix resin resulting in a composition having a viscosity of about 4,000 cps (No. 4 spindle). When combined with a peroxide initiator this composition will rapidly crosslink when sprayed on a hard surface and provide a coating having increased fire retardancy. Use of ethyl acrylate instead of methyl methacrylate results composition having substantially the same properties.

EXAMPLE II

Preparation of sprayable acrylic resin coating composition containing the following components by weight:

| | |
|---|---|
| 40% | Methyl methacrylate resin (Degament 1004) |
| 5% | Acrylate urethane (Sartomer CN-991) |
| 5% | Butyl methacrylate |
| 10% | Methyl Methacrylate |
| 14% | Surface treated alumina trihydrate (ATH) |
| 25% | 50/50 blend of white and black granules as prepared by the procedure of Example B |
| 1% | Fumed silica |
| 0.25% | calcium octoate |
| 0.1% | Pentaerythritol tetra (3-mercaptopropionate) |
| 0.1% | Cobalt naphthenate |
| 1.5% | Methyl methacrylate phosphate |

The components of the composition were combined with gentle agitation until the insoluble components were uniformly distributed in the matrix resin resulting in a composition having a viscosity of about 4,000 cps (No. 4 spindle). When combined with a peroxide initiator, "Eperox 41-25", a commercially available peroxide, this composition will rapidly crosslink when sprayed on a hard surface.

EXAMPLE III

Components of Sprayable Polyester Composition

| Material | | weight % |
|---|---|---|
| Isophthalic NPG resin with styrene (RCI 32168-20) | Polyester resin | 8 |
| Isophthalic NPG resin With Adipic acid/styrene (AOC T750-70) | Polyester resin | 23.6 |
| Styrene | Monomer | 8 |
| Aerosil 200 | Fumed silica | 0.4 |
| FyrolPCF | tri(2-chloroisopropyl0 Phosphate | 0.4 |
| SN-1000 | Coupling agent | 0.25 |
| Tinuvin 328 | UV absorber | 0.25 |
| Tinuvin 292 | Light stabilizer | 0.25 |
| FCG | accelerator | 0.5 |
| ATH 255- | alumina trihydrate | 50 |
| Granules | 50/50 mixture of white and black - Example A | 10 |
| Binding agent | methyl methacrylate phosphate | 1.5 |

Accelerator FCG Composition

| Materials | weight % |
|---|---|
| Isopropanol solvent | 35.6 |
| Sodium Octoate solution (8% sodium) | 45 |
| Potassium naphthenate | 0.15 |
| Cobalt naphthenate solution (12% cobalt) | 5 |
| N,N'-dimethylacetoacetamide | 14 |
| Copper naphthenate solution (8% copper) | 0.05 |
| Copper CEM - All (12% Copper in solution) | 0.2 |

The components of the composition were combined with gentle agitation until the insoluble components were uniformly distributed in the matrix resin resulting in a composition having a viscosity of about 4,000 cps (No. 4 spindle). When combined with a peroxide initiator, such as methyl ethyl ketone peroxide in a concentration of about 2%, this composition will rapidly crosslink when sprayed on a hard surface. This coating composition further meets class A fire retardancy requirements when tested in accordance of ASTM E-84

MANUFACTURING EXAMPLE 1

A prepared fiberglass mold was used to make a shower enclosure unit. The polyester spraying composition of Example III was combined with 1% by weight of MEK peroxide and sprayed using commercially available spraying equipment onto the surface of the mold to a thickness of 20 mil at room temperature. The sprayed coating rapidly crosslinked without any significant flow of the composition even on the vertical surfaces. The sprayed material was totally cured in 25 minutes at 75° F. Sprayed material was backed with fiberglass-reinforced polyester and cured. The fabricated piece released from the mold within 2 hours had a magnificent surface with a gray granite appearance.

MANUFACTURING EXAMPLE 2

A pre-fabricated particleboard with 1.5" bullnose shaped for a kitchen counter top with backsplash was made. The polyester composition of Example III was sprayed over the fabricated counter top making sure to cover all the horizontal and vertical surfaces and bullnosed edge. The sprayed piece completely cured within 20-30 minutes at 75. degree. F. The cured counter top had a textured finish, which may be used as sprayed. However, to simulate the texture and look of high polished natural granite, the piece was sanded to a satin finish similar in appearance to a solid surface material such as DUPONT CORIAN and then polished to obtain a glossy surface. In addition, the specific gravity identity between the matrix and the granules created a three-dimensional look within a clear matrix. MANUFACTURING EXAMPLE 3

A clear acrylic panel was prepared and vacuum formed to the shape of a bathtub. To the acrylic resin spraying composition of Example III 1% by weight of the composition of PMA catalyst for was added. The above-described coating material was then sprayed using commercially available spraying equipment vertically on its exterior surface. Coating on the panel was cured 25-30 minutes at 75° F. The coating adhered to the acrylic sheet permanently because the acrylic acid in the composition had chemical bonding effects with the acrylic substrate before it became a part of the cross-linking. A combination of fiberglass and resin was applied to the exterior to reinforce the tub. The interior bathtub finish looks like glass-covered granite.

The foregoing examples are deemed to be illustrative and are not to be interpreted as limiting.

The invention claimed is:

1. A fluid coating composition which comprises a crosslinkable liquid resin matrix, wherein the resin is an unsaturated polyester resin containing therein uniformly distributed (a) a crosslinked particulate resin granule containing an inorganic filler and visually differentiable from the matrix resin (b) alumina trihydrate (c) from 0.5 to 5% by weight of the composition of an acrylate phosphate obtained by the reaction of a phosphorus penta oxide with hydroxy acrylates and (d) a crosslinking accelerator containing 0.1 to 2.5% by weight of the composition of sodium carboxylate wherein the carboxylate moiety has from 6 to 22 carbon atoms and 0.1 to 2.5% of dimethyl or diethyl acetoacetamide.

2. The composition of claim 1 wherein the granule and the matrix resin contain alumina trihydrate.

3. The composition of claim 1 wherein the sodium carboxylate is sodium octoate, sodium naphthenate, sodium benzoate, or sodium laurate.

4. The composition of claim 3 wherein the sodium carboxylate is sodium octoate.

* * * * *